US009471569B1

(12) United States Patent
Johnston

(10) Patent No.: US 9,471,569 B1
(45) Date of Patent: Oct. 18, 2016

(54) INTEGRATING INFORMATION SOURCES TO CREATE CONTEXT-SPECIFIC DOCUMENTS

(75) Inventor: Simon K. Johnston, Mercer Snohomish, WA (US)

(73) Assignee: Amazon Technologies, Inc., Seattle, WA (US)

(*) Notice: Subject to any disclaimer, the term of this patent is extended or adjusted under 35 U.S.C. 154(b) by 179 days.

(21) Appl. No.: 13/245,221

(22) Filed: Sep. 26, 2011

(51) Int. Cl.
   *G06F 7/00* (2006.01)
   *G06F 17/30* (2006.01)
(52) U.S. Cl.
   CPC .................... *G06F 17/30* (2013.01)
(58) Field of Classification Search
   None
   See application file for complete search history.

(56) References Cited

U.S. PATENT DOCUMENTS

| 7,149,970 | B1* | 12/2006 | Pratley et al. | 715/257 |
| 7,496,567 | B1* | 2/2009 | Steichen | G06F 17/30707 |
| 8,190,625 | B1* | 5/2012 | Beach | G06F 17/30014 |
| | | | | 707/718 |
| RE45,371 | E* | 2/2015 | Simons | 715/224 |
| 2004/0220884 | A1* | 11/2004 | Khan | 705/80 |
| 2008/0126396 | A1* | 5/2008 | Gagnon | 707/102 |
| 2012/0078950 | A1* | 3/2012 | Conrad et al. | 707/769 |

* cited by examiner

*Primary Examiner* — Thu Nga Nguyen
(74) *Attorney, Agent, or Firm* — Thomas | Horstemeyer, LLP

(57) ABSTRACT

Disclosed are various embodiments for creating a "tailored" document by combining specific parameter values with a generalized document constructed to accept parameter values. The specific parameter values may substitute for default parameter values of the general document, and/or may suggest portions of the general document that can be omitted from the tailored document. Additional specific parameter values may be retrieved by querying available data stores using one or more specific parameter values as criteria in the query. Furthermore, the tailored documents may be correlated to identify symptoms of systemic events that may be collectively reported within the individual tailored documents. For the systemic events that are identified, the tailored documents associated with the event may be modified to incorporate a suggested response in the body of the tailored documents.

19 Claims, 6 Drawing Sheets

INTEGRATING INFORMATION SOURCES TO CREATE CONTEXT-SPECIFIC DOCUMENTS

BACKGROUND

People read documents to obtain information. Many documents are written in a general form that makes it difficult to access the information relevant to a particular reader. Searching a document to find the relevant portions may be inefficient and error-prone.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure describes a framework whereby context-specific, "tailored" documents can be created using generalized documents as templates. Among other potential techniques, the framework creates tailored documents through the use of parameters. The specific parameter values may substitute for default parameter values of the general document, and/or may suggest portions of the general document that can be omitted from the tailored document as redundant or inapplicable under conditions indicated by the specific parameter values. Additionally, the specific parameter values may indicate portions of other documents to be included in the tailored document. The specific parameter values may be provided through numerous possible methods, including, but not limited to, a user interface of an application, a data store, a network page of a web browser or a network link.

Additional specific parameter values may be retrieved by querying available data stores using one or more specific parameter values as criteria in the query. The specific parameter values retrieved via the data stores may be used where no parameter value was supplied by the client or to further validate a specific parameter value supplied by the client.

Furthermore, the tailored documents and/or the specific parameter values contained within the tailored documents may be correlated to identify symptoms of systemic events that may be collectively reported within the individual tailored documents. For the systemic events that are identified, the tailored documents associated with the event may be modified to incorporate a suggested response in the body of the tailored documents. In the following discussion, a general description of the system and its components is provided, followed by a discussion of the operation of the same.

Figure 1:
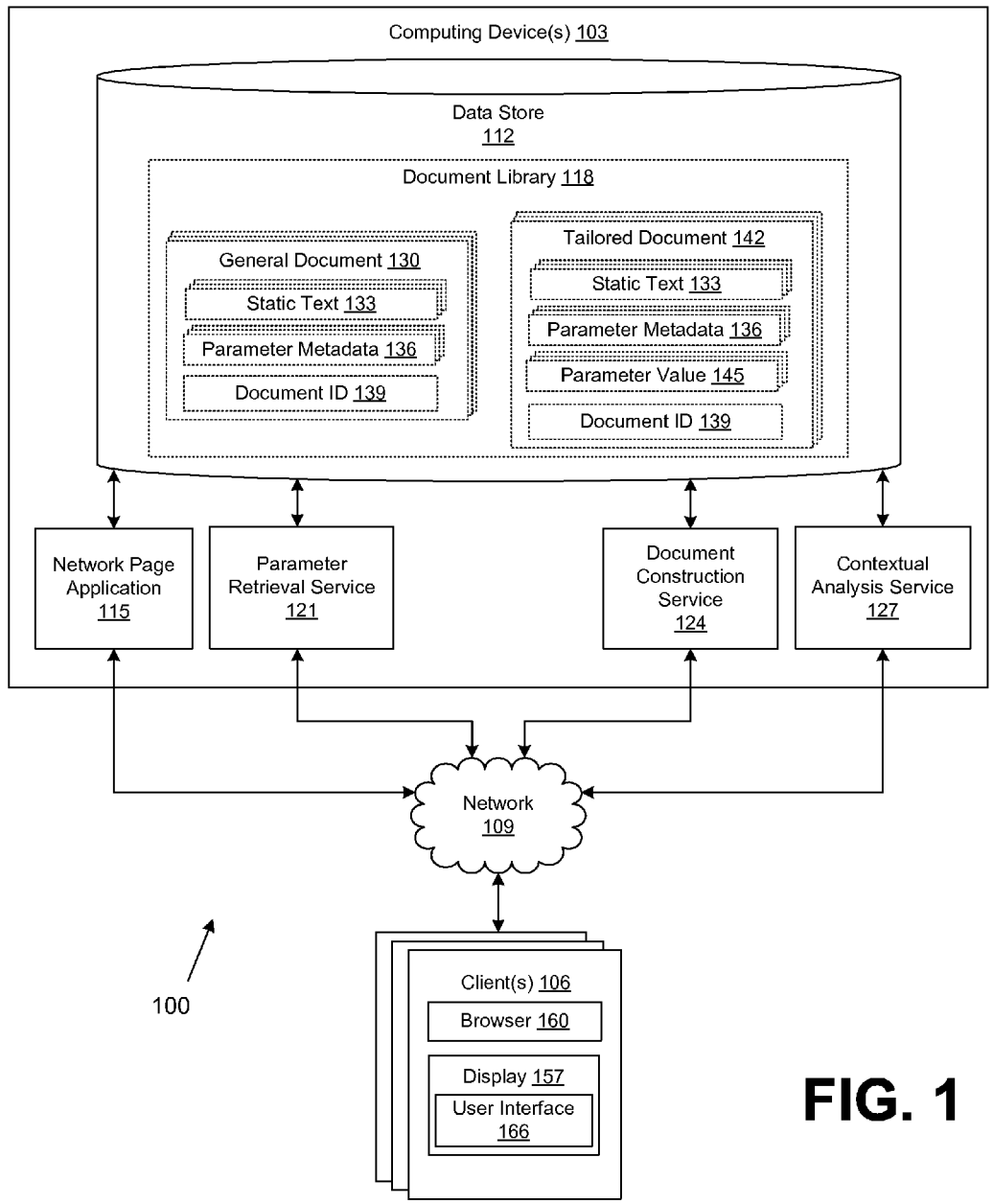
FIG. 1 is a drawing of a networked environment according to various embodiments of the present disclosure.

With reference to FIG. 1, shown is a network environment 100 according to various embodiments. The network environment 100 includes a computing device 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores as can be appreciated. The data stored in the data store 112, for example, is associated with the operation of the various applications and/or functional entities described below.

The components executed on the computing device 103, for example, include network page application 115, parameter retrieval service 121, document construction service 124, contextual analysis service 127 and other applications, services, processes, systems, engines, or functionality not discussed in detail herein.

The network page application 115 is executed to facilitate the collection of the parameter values 145. In one embodiment, the network page application 115 may generate a user interface or portions thereof that are provided to clients 106 for the purpose of inputting the parameter values 145 corresponding to parameter metadata 136 of a general document 130. Another embodiment may further involve limitations upon the parameter values 145 based upon the parameter metadata 136, such as requiring some parameter values 145 to be entered as all digits, limited to five characters or other such limitations as can be appreciated. In another embodiment, additional dependencies may be expressed in the parameter metadata 136 that require, for instance, certain parameter values 145 to be entered, that some parameter values 145 are exclusive of other values or other such limitations as can be appreciated.

The parameter retrieval service 121 is executed to facilitate the retrieval of parameter values 145 from a data store 112. The parameter retrieval service 121 first examines parameter metadata 136 to determine the universe of available parameter values 145. Next, the parameter retrieval service 121 analyzes the previously received parameter values 145 and the data stores 112 available in order to determine the further parameter values 145 that may be retrieved.

In one embodiment, the parameter retrieval service 121 uses parameter values 145 to retrieve additional parameter values 145 for which no previous value has been assigned. For example, based upon parameter values 145 that makeup a street address, the parameter retrieval service 121 may retrieve the parameter value 145 of the ZIP code corresponding to the street address. In another embodiment, the parameter retrieval service 121 may retrieve parameter values 145 to replace a previously assigned parameter value 145. For example, based upon parameter values 145 that makeup a street address, the parameter retrieval service 121 may replace the parameter value 145 of the ZIP code if the value was incorrect for the given street address.

The document construction service 124 is executed to construct a tailored document 142. To this end, the document construction service 124 may replace the parameter labels present in the static text 133 of the body of a general document 130 with a corresponding parameter value 145 obtained from the network page application 115 and/or the parameter retrieval service 121. In one embodiment, the parameter labels in the body of a general document 130 may be identified using Hyper Text Markup Language (HTML), eXtensible Markup Language (XML), Standard Generalized Markup Language (SGML) or other markup format. In another embodiment the parameter labels may be identified using a regular expression or other character pattern recognition, such as may be employed by a lexical analyzer.

The document construction service 124 may further construct a tailored document 142 by omitting portions of the body of the general document 130 and/or including portions from another general document 130, based at least in part upon the presence or absence of one or more of the parameter values 145. The parameter metadata 136 identifies the location of the static text 133 that may be omitted or included from another document, as well as the conditions under which the operation(s) may occur. In one embodiment, the location of the static text 133 in the body of a general document 130 that may be omitted or included may be identified using HTML, XML, SGML or other markup format. In another embodiment the location of the static text 133 may be identified using a regular expression or other character pattern recognition, such as may be employed by a lexical analyzer.

The contextual analysis service 127 may examine tailored documents 142 and/or parameter values 145 in order to recognize symptoms of systemic events that may be reported in the individual documents. Recognition of the symptoms may be based on a correlation of the tailored documents 142 and/or parameter values 145 using techniques such as cosine similarity, Hamming distance or other techniques as can be appreciated. Symptoms present in the positively correlated ones of the tailored documents 142 may be recorded for further action. In one embodiment, the contextual analysis service 127 may identify a suggested response corresponding to the symptoms of systemic events identified in the tailored documents 142. This embodiment may further incorporate the suggested response in the body of the tailored documents 142.

As a non-limiting example, consider a customer reporting an electrical power outage to the customer's power company. A general document 130 may exist that represents the steps that a technician may take in troubleshooting the outage. Upon each customer reporting an outage, a tailored document 142 is created using based upon the general document 130, but which is customized for outage as reported by each customer. The customizations may include integration of the customer's name, service address, details about the outage, when the outage occurred, troubleshooting steps completed, etc.

Continuing with the example, the contextual analysis service 127 may correlate the tailored documents 142 and determine that a subset of the tailored documents reports an ongoing power outage in the same local area. Based on the recognition of the symptoms of a localized power outage collectively demonstrated across numerous tailored documents 142, the contextual analysis service 127 may identify a response that may then be incorporated into the positively correlated tailored documents 142. Whereas each tailored document may have previously instructed the technicians to focus on resolving the problem at each service address, the contextual analysis service 127 may modify each of the tailored documents to focus on resolving the problem at a distribution point common to those reporting the outage.

The data stored in the data store 112 includes, for example, the documents library 118, and potentially other data. The document library 118 relates to stored documents and may include general documents 130 as well as tailored documents 142. The general documents 130 are those documents written generically such that they are relevant to a variety of potential scenarios, but lacking customization for any particular scenario. For instance, a general document 130 for troubleshooting a device may include a set of actions to be taken if a particular warning light is steadily illuminated, and a different set of actions to be taken if the warning light is flashing. In this particular scenario, the warning light will be in one of the two states, but not both. However, a general document is written to cover both potential scenarios.

A tailored document 142 is based upon a general document 130, but includes customizations to a general document 130 based upon the parameter values 145 associated with a particular scenario. For instance, continuing with the example of troubleshooting a warning light, if a parameter value 145 indicated that the warning light was steadily illuminated, the tailored document 142 for this scenario may include only the actions to be taken for a steadily illuminated warning light. The tailored documents 142 may omit references to other potential states when, as in this example, they are not applicable under the particular circumstances.

A general document 130 may include static text 133, parameter metadata 136, a document ID 139, and potentially other data. The document ID 139 includes any type of identifier that may be used to uniquely identify a general document. The static text 133 includes the readable text in the body of a general document 130. For instance, in the example of troubleshooting a warning light, the actions to be taken depending on whether the warning light was steadily illuminated or flashing would be communicated using static text 133.

The parameter metadata 136 may include information about the parameters and body of a general document 130 as they may be used to construct a tailored document 142. The parameter metadata 136 may include information such as whether a parameter value is required, the number of characters of the parameter value 145, the format of the parameter value and dependencies among other parameters. Additionally, parameter metadata 136 may include one or more parameter labels within the body of the documents that identify default general text that may be replaced with a parameter value 145.

For instance, a document may instruct a user to "open a web browser and connect to the website to be tested." In this example, a parameter label may identify the phrase "the website to be tested" as replaceable with the host name of the actual website, such that the instruction in the tailored document may appear as "open a web browser and connect to www.example.com." Furthermore, the parameter metadata 136 may include information about the locations of the static text 133 that may be omitted from the general document 130 or included from other documents, the conditions under which the operation(s) may occur and any dependencies that may exist among the omitted and/or included blocks of static text 133.

The tailored documents 142 may include static text 133, parameter metadata 136, document ID 139 and parameter values 145. The static text 133, parameter metadata 136 and document ID 139 were all discussed previously with regard to the general documents 130. The parameter values 145 include the specific values for a parameter. For example, consider a parameter, customer name. In this example, the parameter value "John Doe" may be associated with the customer name parameter, such that any parameter labels for the customer name parameter may be replaced with the parameter value 145 of "John Doe."

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 157. The display 157 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 160 and/or other applications. The browser 160 may be executed in a client 106, for example, to access and render network pages, such as web pages, or other network content served up by the computing device 103 and/or other servers, thereby rendering a user interface 166 on the display 157.

Next, a general description of the operation of the various components of the networked environment 100 is provided. To begin, a client 106 specifies a general document 130 to be tailored. In one embodiment, the client 106 may interact with the network page application 115 through the browser 160 or another application via the network 109 to specify the general document 130 and parameter values 145. This embodiment may further require one or more parameter values 145 be supplied for the general document 130, such required parameter values 145 may be specified in the parameter metadata 136 for each general document 130.

Once the client 106 specifies the general document 130 and any parameter values 145 that may be required, the network page application 115 may submit the parameter values 145 and the document ID 139 corresponding to the general document 130 to the document construction service 124 for processing.

In an alternative embodiment, the client 106 may bypass the network page application 115 and may submit the parameter values 145 and the document ID 139 corresponding to the general document 130 to the document construction service 124 directly.

The document construction service 124 then prepares to tailor the general document 130 using the parameter values 145. To this end, in one embodiment, the document construction service 124 first examines the parameter metadata 136 and the parameter values 145 that are supplied to determine if all parameters have been given a value. If some parameters have not been assigned a parameter value 145, the parameter values 145 and the document ID 139 associated with the general document 130 may be submitted to the parameter retrieval service 121. In an alternative embodiment, the document construction service 124 may submit the parameter values 145 and the document ID 139 associated with every general document 130 received to the parameter retrieval service 121.

The parameter retrieval service 121 obtains further parameter values 145 associated with a general document 130. To this end, in one embodiment, the parameter retrieval service 121 may retrieve further parameter values 145 by querying one or more data stores. This embodiment may further use one or more of the previously received parameter values 145 as query criteria. For example, given a parameter value 145 corresponding to a street address, the parameter retrieval service 121 may query a data store using the street address as a criterion to obtain a parameter value 145 corresponding to a ZIP code.

In another embodiment, parameter retrieval service 121 may validate parameter values 145 that were provided by the client 106. For example, the parameter value 145 corresponding to a ZIP code that was obtained in the above example may be used to validate a parameter value 145 corresponding to a ZIP code that was entered by the client 106. Upon determination by the parameter retrieval service 121 that no further parameter values 145 may be discovered, the parameter values 145 and the document ID 139 associated with the general document 130 may be returned to the document construction service 124.

The tailoring process may begin to construct a tailored document 142 by omitting portions of the body of the general document 130 and/or including portions from another general document 130, based at least in part upon the presence or absence of one or more of the parameter values 145. Continuing the tailoring process, the document construction service 124 may replace the parameter labels in the body of the tailored document 142 with one or more associated parameter values 145. Parameter labels that have no associated parameter value 145 may remain in the default generalized form.

Once the document construction service 124 completes the initial tailoring process, the contextual analysis service 127 may then examine the tailored document 142 and/or parameter values 145 to recognize symptoms of systemic events that may be reported in the individual documents. Recognition of the symptoms may be based on a correlation of the tailored documents 142 and/or parameter values 145. As a non-limiting example, the correlation may be performed using techniques associated with a term vector model, such as cosine similarity or other techniques as one may appreciate. Symptoms present in the positively correlated ones of the tailored documents 142 and/or parameter values 145 may be recorded for further action. In one embodiment, the contextual analysis service 127 may identify a suggested response corresponding to the symptoms of systemic events identified in the tailored documents 142 and/or parameter values 145. This embodiment may further incorporate the suggested response in the body of the positively correlated ones of the tailored documents 142.

Figure 2:
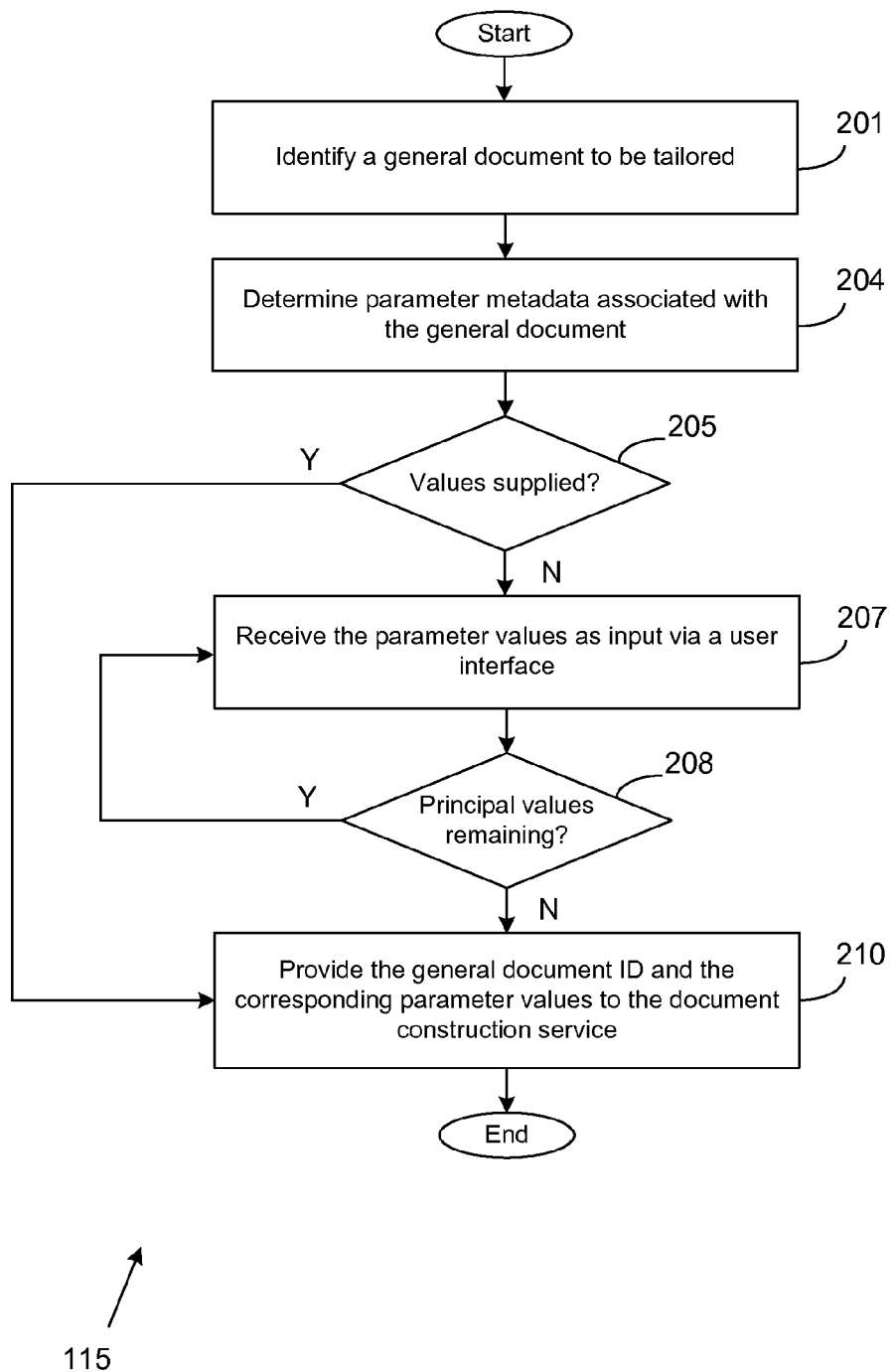
FIG. 2 is a flowchart illustrating one example of functionality implemented as portions of the network page application executed in a computing device in the networked environment of FIG. 1 according to various embodiments of the present disclosure.

Referring next to FIG. 2, shown is a flowchart that provides one example of the operation of a portion of the network page application 115 according to various embodiments. It is understood that the flowchart of FIG. 2 provides merely an example of the many different types of functional arrangements that may be employed to implement the operation of the portion of the network page application 115 as described herein. As an alternative, the flowchart of FIG. 2 may be viewed as depicting an example of steps of a method implemented in the computing device 103 (FIG. 1) according to one or more embodiments.

Beginning with box 201, the network page application 115 identifies the general document 130 (FIG. 1) to be tailored. Numerous potential embodiments exist for specifying the general document 130 or the document ID 139 (FIG. 1) corresponding to the general document 130 as can be appreciated.

Next, in box 204, the network page application 115 (FIG. 1) may identify the parameter metadata 136 (FIG. 1) associated with the selected general document 130. The parameter metadata 136 may include information about the parameters of a general document 130 as they may be used to construct a tailored document 142 (FIG. 1). The parameter metadata 136 may include information such as whether a parameter value is required, the number of characters of the parameter value 145 (FIG. 1), the format of the parameter value 145, dependencies among other parameters, etc.

Subsequently, in box 205, if the parameter values 145 have been supplied via a network link, a data store, a file, or such other techniques as can be appreciated, operation of the network page application 115 may skip to box 210. Alternatively, in box 207, the network page application 115 may receive as input to the user interface, the parameter values 145 corresponding to the parameter metadata 136 identified in box 204. Subsequently, in box 208, the process of receiving the parameter values 145 may continue at least until all the parameter values 145 that are required for a particular general document 130 are received or until interrupted by the computing device 103.

Moving on to box 210, the network page application 115 may provide the information collected by the network page application 115 to the document construction service 124 (FIG. 1) for further processing. Thereafter, this portion of the network page application 115 ends as shown.

Figure 3:
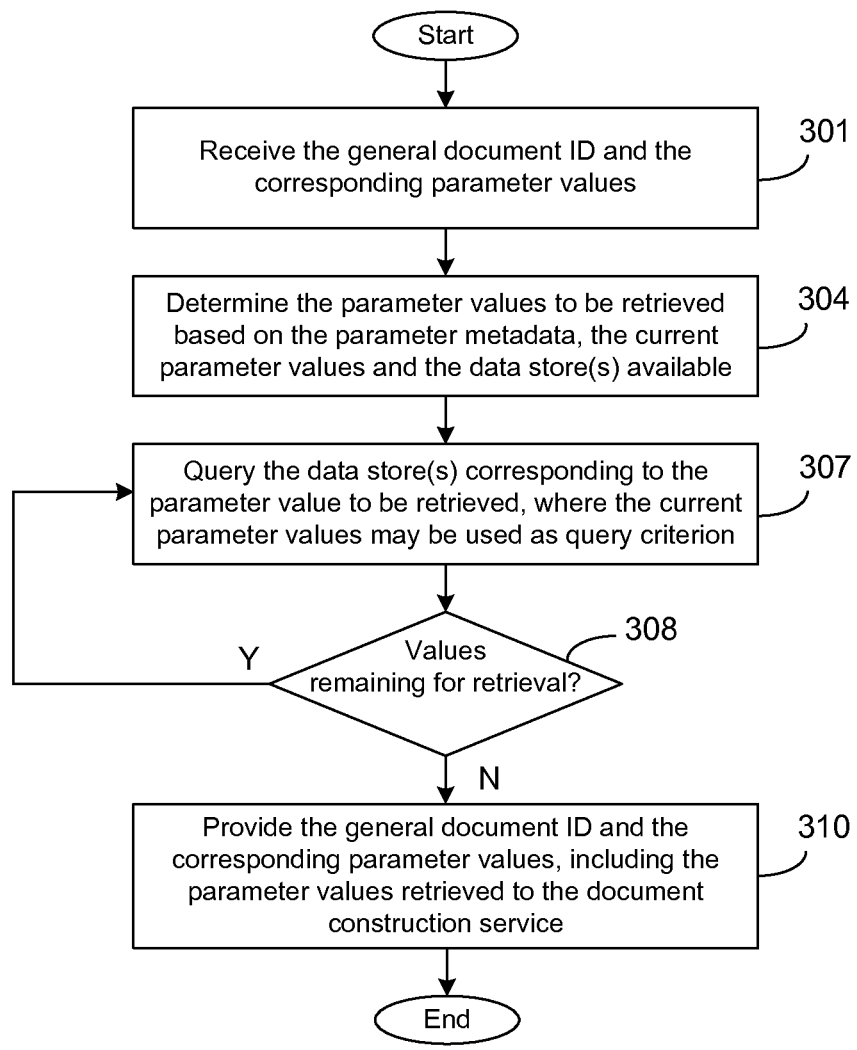
FIG. 3 is a flowchart illustrating one example of functionality implemented as portions of parameter retrieval service executed in a computing device in the networked environment of FIG. 1 according to various embodiments of the present disclosure.

Turning now to FIG. 3, shown is a flowchart that provides one example of the operation of a portion of the parameter retrieval service 121 according to various embodiments. It is understood that the flowchart of FIG. 3 provides merely an example of the many different types of functional arrangements that may be employed to implement the operation of the portion of the parameter retrieval service 121 as described herein. As an alternative, the flowchart of FIG. 3 may be viewed as depicting an example of steps of a method implemented in the computing device 103 (FIG. 1) according to one or more embodiments.

Beginning with box 301, the parameter retrieval service 121 receives a document ID 139 (FIG. 1) and parameter values 145 (FIG. 1) corresponding to parameter metadata 136 (FIG. 1). Next, in box 304, the parameter retrieval service 121 may determine further parameter values 145 that may be retrieved based at least in part on the parameter metadata 136, the parameter values 145 presently available and at least one data store 112 (FIG. 1).

Then, in box 307, the parameter retrieval service 121 may query a data store corresponding to the parameter value 145 to be retrieved. In one embodiment, one or more of the parameter values 145 presently available may be submitted to the data store as an element of the query criteria. Subsequently, in box 308, the parameter retrieval service 121 may continue this operation until all of the parameter values 145 determined, in box 304, as capable of being retrieved have been attempted, or until interrupted by the computing device 103 (FIG. 1). Finally, in box 310, the parameter retrieval service 121 returns the document ID 139 and parameter values 145 to the document construction service 124 (FIG. 1). Thereafter, this portion of the parameter retrieval service 121 ends as shown.

Figure 4:
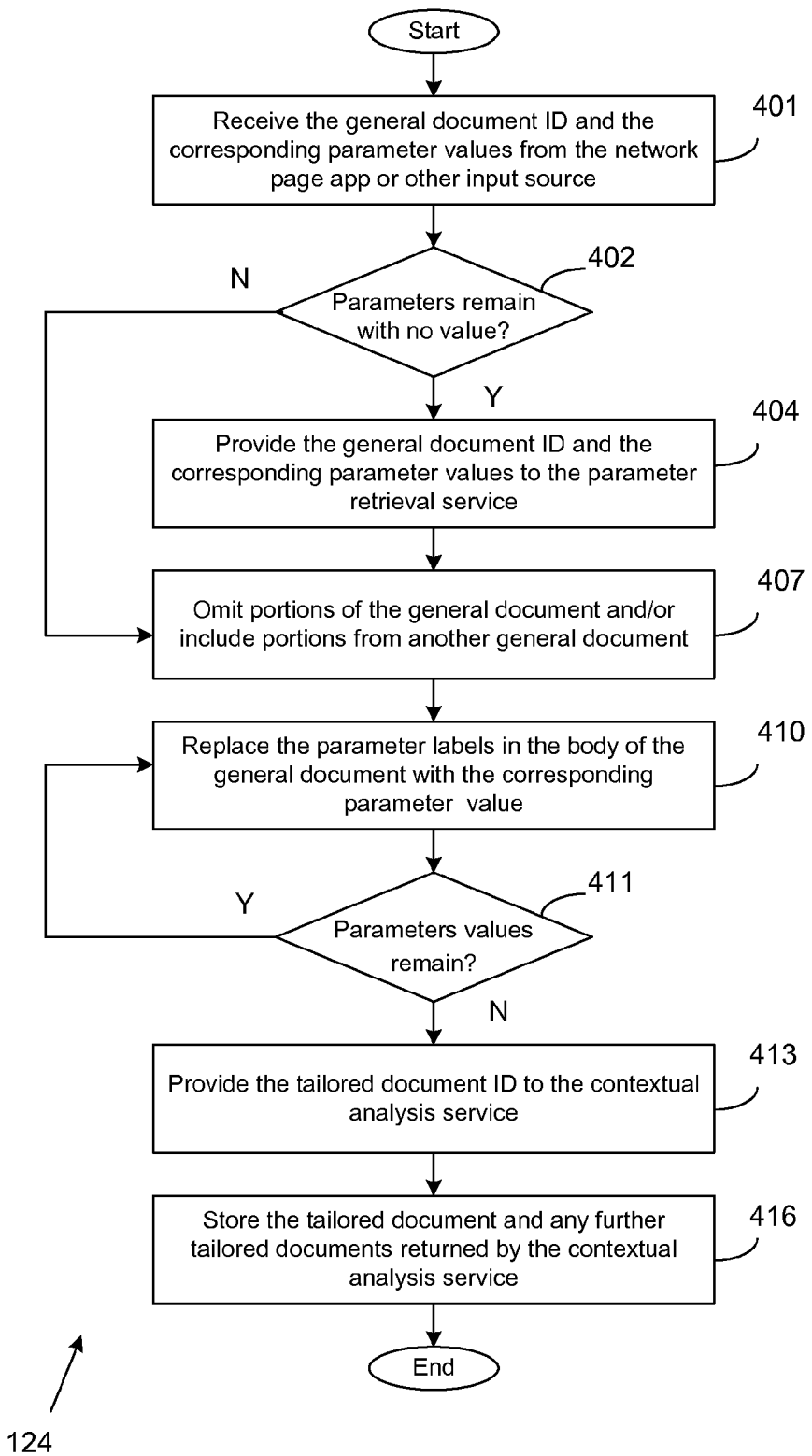
FIG. 4 is a flowchart illustrating one example of functionality implemented as portions of document construction service executed in a computing device in the networked environment of FIG. 1 according to various embodiments of the present disclosure.

Moving on to FIG. 4, shown is a flowchart that provides one example of the operation of a portion of the document construction service 124 according to various embodiments. It is understood that the flowchart of FIG. 4 provides merely an example of the many different types of functional arrangements that may be employed to implement the operation of the portion of the document construction service 124 as described herein. As an alternative, the flowchart of FIG. 4 may be viewed as depicting an example of steps of a method implemented in the computing device 103 (FIG. 1) according to one or more embodiments.

Beginning with box 401, the document construction service 124 may receive a document ID 139 (FIG. 1) and associated parameter values 145 (FIG. 1) from the network page application 115 (FIG. 1) or from an alternate source. In one embodiment, as demonstrated in box 402, if there are parameter values 145 associated with each parameter within the parameter metadata 136 (FIG. 1), then box 404 is skipped making the next operation box 407. In an alternate embodiment or, as in box 402, if a parameter within the parameter metadata 136 does not have an associated parameter value, the next operation is box 404.

Next, in box 404, the document construction service 124 may provide the document ID 139 and parameter values 145 to the parameter retrieval service 121 (FIG. 1) for further processing, as shown in FIG. 3. Subsequently, in box 407, construction of the tailored document 142 (FIG. 1) may begin by omitting portions of the static text 133 (FIG. 1) associated with the general document 130 (FIG. 1) and/or including portions from another general document 130 based at least in part upon the presence or absence of one or more of the parameter values 145. The parameter metadata 136 identifies the location of the static text 133 that may be omitted or included from another document, as well as the conditions under which the operation(s) may occur, as the conditions may relate to the parameter values 145. In one embodiment, the location of the static text 133 to be omitted or included may be identified using HTML, XML, SGML or other markup format. In another embodiment, the location of the static text 133 may be identified using a regular expression or other character pattern recognition, such as may be employed by a lexical analyzer.

Moving on, in box 410, the document construction service 124 may replace the parameter labels present in the static text 133 of the body of a tailored document 130 with the corresponding parameter value 145. In one embodiment, the parameter labels in the body of a general document 130 may be identified using HTML, XML, SGML or other markup format. In another embodiment the parameter labels may be identified using a regular expression or other character pattern recognition, such as may be employed by a lexical analyzer. Next, in box 411, the document construction service 124 may continue the operation for as long as parameter values 145 remain that have not been integrated into the tailored document 142.

Figure 5:
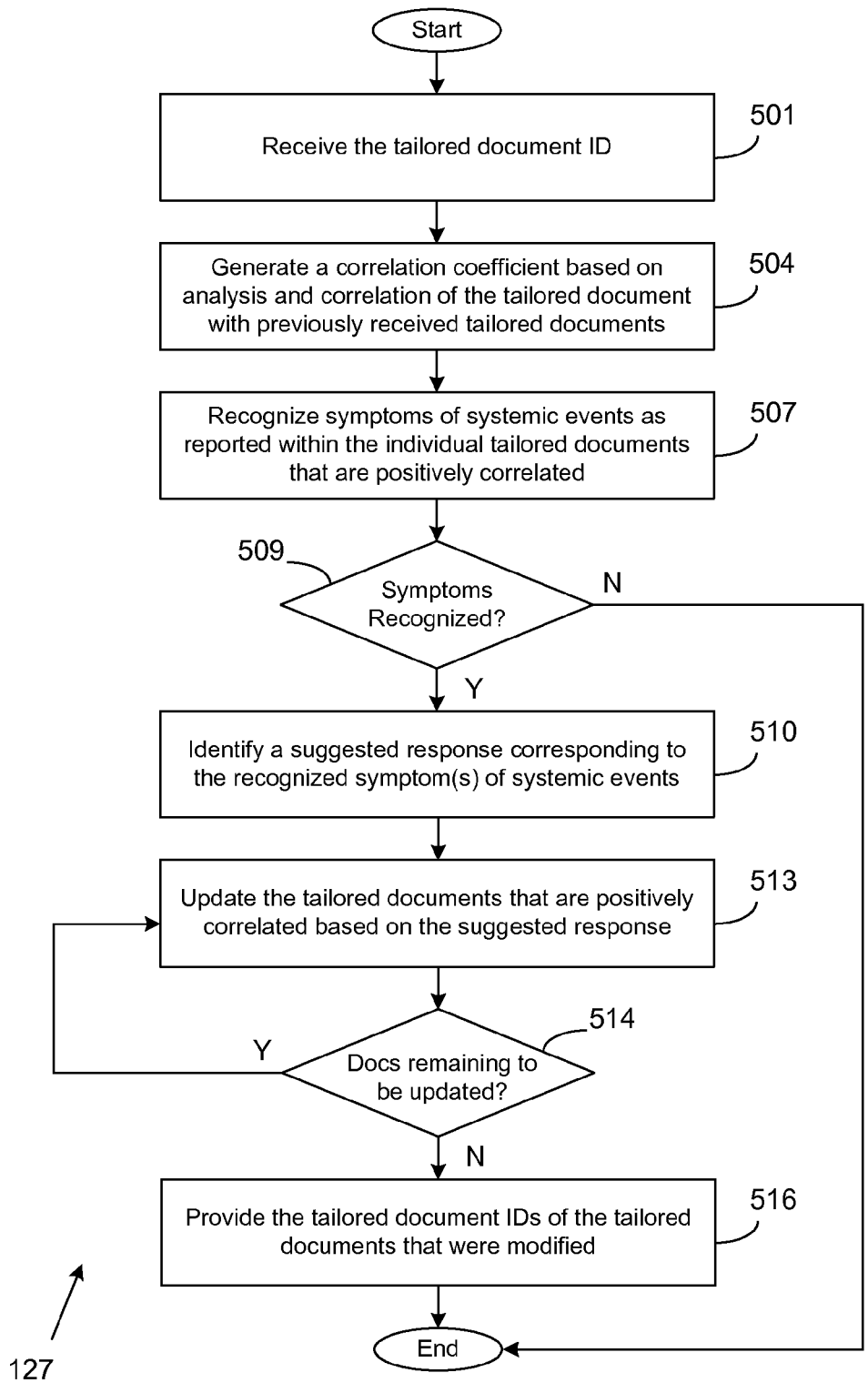
FIG. 5 is a flowchart illustrating one example of functionality implemented as portions of contextual analysis service executed in a computing device in the networked environment of FIG. 1 according to various embodiments of the present disclosure.

Then, in box 413, the document construction service 124 may provide the tailored document 142 and/or parameter values 145 to the contextual analysis service 127 for further processing, as shown in FIG. 5. Next, in box 416, the document construction service 124 may store the tailored document 142 and/or parameter values 145 as well as any additional tailored documents 142 and/or parameter values 145 that were modified by the contextual analysis service 127. In one embodiment, the tailored documents 142 are stored in one or more data stores 112 (FIG. 1) as complete files. In another embodiment, the tailored documents 142 are stored in one or more data stores 112 as network links that include the parameter values 145 and the document ID 139 corresponding to the general document 130 from which the tailored document 142 was created. Thereafter, this portion of the document construction service 124 ends as shown.

Referring next to FIG. 5, shown is a flowchart that provides one example of the operation of a portion of the contextual analysis service 127 according to various embodiments. It is understood that the flowchart of FIG. 5 provides merely an example of the many different types of functional arrangements that may be employed to implement the operation of the portion of the contextual analysis service as described herein. As an alternative, the flowchart of FIG. 5 may be viewed as depicting an example of steps of a method implemented in the computing device 103 (FIG. 1) according to one or more embodiments.

Beginning with box 501, the contextual analysis service 127 receives a document ID 139 (FIG. 1) associated with a tailored document 142 (FIG. 1). Next, in box 504, the tailored document 142 and/or parameter values 145 are correlated with additional tailored documents 142 and/or parameter values 145 that were previously received, producing a degree of correlation. A positive degree of correlation suggests the compared tailored documents 142 and/or parameter values 145 are positively correlated, whereas a zero or negative degree of correlation suggests the compared tailored documents 142 and/or parameter values 145 are not related or are inversely related.

Thereafter, in box 507, the contextual analysis service 127 may recognize symptoms of systemic events as collectively reported in the individual tailored documents 142 and/or parameter values 145 that are positively correlated. The symptoms may be identified at least in part by recognizing similarities in the parameter values 145 (FIG. 1) associated with the tailored documents 142, as well as potentially recognizing similarities in the static text 133 (FIG. 1) in the body of the tailored documents 142. As a non-limiting example, correlating the documents by recognizing similarities may be performed using techniques associated with a term vector model, such as cosine similarity or other techniques as one may appreciate. Next, in box 509, if the contextual analysis service 127 cannot determine a systemic event associated with the symptoms and a response to the event, the contextual analysis service 127 may end as shown.

In the alternative, in box 510, the contextual analysis service 127 determines a systemic event associated with the symptoms and a response to the event. Then, in boxes 513 and 514, the contextual analysis service 127 may modify all the tailored documents 142 that are identified as sharing the symptoms of the systemic event, to include the suggested response. Moving on, in box 516, the contextual analysis service 127 returns the document IDs 139 associated with the respective tailored documents 142 that were modified to the document construction service 124. Thereafter, this portion of the contextual analysis service 127 ends as shown.

Figure 6:
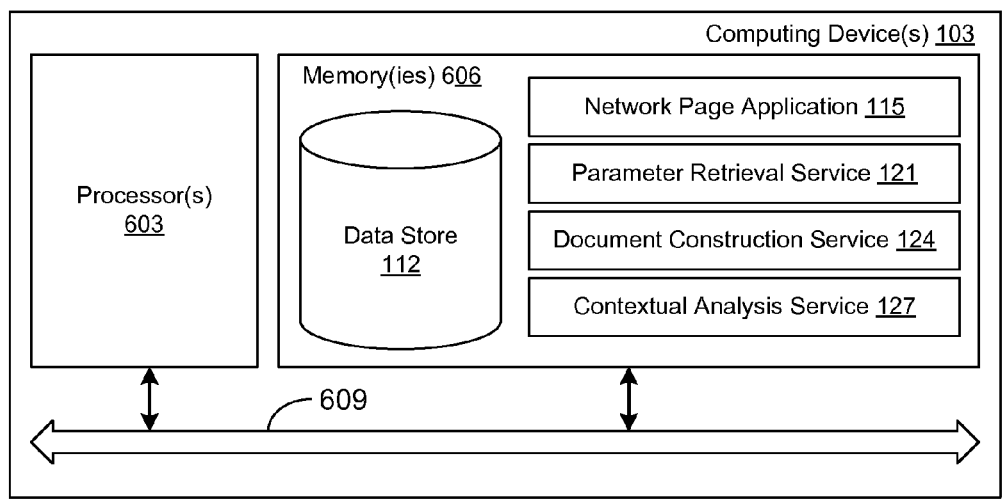
FIG. 6 is a schematic block diagram that provides one example illustration of a computing device employed in the networked environment of FIG. 1 according to various embodiments of the present disclosure.

With reference to FIG. 6, shown is a schematic block diagram of the computing device 103 according to an embodiment of the present disclosure. The computing device 103 includes at least one processor circuit, for example, having a processor 603 and a memory 606, both of which are coupled to a local interface 609. To this end, the computing device 103 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are network page application 115, parameter retrieval service 121, document construction service 124, contextual analysis service 127, and potentially other applications and/or services. Also stored in the memory 606 may be a data store 112 and other data. In addition, an operating system may be stored in the memory 606 and executable by the processor 603.

It is understood that there may be other applications that are stored in the memory 606 and are executable by the processors 603 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network 109 (FIG. 1) that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the network page application 115, parameter retrieval service 121, document construction service 124, contextual analysis service 127, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2, 3, 4 and 5 show the functionality and operation of an implementation of portions of the network page application 115, parameter retrieval service 121, document construction service 124 and contextual analysis service 127, respectively. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the FIGS. 2, 3, 4 and 5 show a specific order of execution, it is understood that the order of execution may differ from that which is depicted. For example, the order of execution of two or more blocks may be scrambled relative to the order shown. Also, two or more blocks shown in succession in FIGS. 2, 3, 4 and 5 may be executed concurrently or with partial concurrence. Further, in some embodiments, one or more of the blocks shown in FIGS. 2, 3, 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic, application or service described herein, including the network page application 115, parameter retrieval service 121, document construction service 124 and contextual analysis service 127, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method comprising:
   identifying, by at least one computing device, parameter metadata associated with constructing one of a plurality of tailored documents from a general document, wherein the parameter metadata comprises a plurality of parameter labels within the general document;
   obtaining, by the at least one computing device, a plurality of supplied values associated with the parameter metadata;
   retrieving, by the at least one computing device, a plurality of retrieved values associated with the parameter metadata, wherein the plurality of retrieved values are determined from the plurality of supplied values and at least one data store;
   constructing, by the at least one computing device, the one of the plurality of tailored documents from the general document, wherein the plurality of supplied values and the plurality of retrieved values supplant at least a portion of the plurality of parameter labels in a body of the general document;

determining, by the at least one computing device, a positive degree of correlation in a subset of the plurality of tailored documents, wherein the subset of the plurality of tailored documents includes multiple tailored documents and the positive degree of correlation indicates that the subset of the plurality of tailored documents are positively correlated by recognizing similarities within the plurality of tailored documents;

recognizing, by the at least one computing device, at least one symptom of a systemic event collectively reported within the subset of the plurality of tailored documents that are positively correlated;

identifying, by the at least one computing device, a response to the at least one symptom of the systemic event; and modifying, by the at least one computing device, individual ones of the subset of the plurality of tailored documents based at least in part on the response to the at least one symptom of the systemic event.

2. The method of claim 1, wherein the plurality of supplied values associated with the parameter metadata are obtained from the at least one data store.

3. The method of claim 1, further comprising omitting at least one portion of the general document from the one of the plurality of tailored documents, wherein a decision to omit the at least one portion of the general document is based on the plurality of supplied values.

4. The method of claim 1, further comprising modifying the plurality of supplied values within the one of the plurality of tailored documents.

5. A system, comprising:
a data store configured to store at least specific computer-executable instructions;
at least one computing device comprising a hardware processor and in communication with the data store, the at least one computing device configured to execute the specific computer-executable instructions to at least:
identify parameter metadata associated with constructing one of a plurality of tailored documents from a general document, wherein the parameter metadata identifies a plurality of parameter labels within the general document; and
obtain a plurality of supplied values associated with the parameter metadata;
fetch a plurality of retrieved values associated with the parameter metadata in response to sending a query to the data store, the query being associated with at least one of the plurality of supplied values; and
construct the one of the plurality of tailored documents from the general document, wherein the plurality of supplied values and the plurality of retrieved values supplant at least a portion of the parameter labels within a body of the general document;
determine a positive degree of correlation in a subset of the plurality of tailored documents, wherein the subset of the plurality of tailored documents includes multiple tailored documents and the positive degree of correlation indicates that the subset of the plurality of tailored documents are positively correlated by recognizing similarities within the plurality of tailored documents;
recognize at least one symptom of a systemic event collectively reported within the subset of the plurality of tailored documents that are positively correlated;
identify a response to the at least one symptom of the systemic event; and
modify the one of the plurality of tailored documents based at least in part on the response to the at least one symptom of the systemic event.

6. The system of claim 5, wherein the at least one computing device is further configured to execute the specific computer-executable instructions to at least identify a plurality of values that may be retrieved, the plurality of values being identified based at least in part on the parameter metadata, the plurality of supplied values, and the data store.

7. The system of claim 5, wherein the plurality of supplied values are retrieved from the data store.

8. The system of claim 5, wherein the plurality of supplied values are received in a network page.

9. The system of claim 5, wherein the plurality of supplied values are received in a network link.

10. The system of claim 5, wherein the plurality supplied values are obtained for a proper subset of the parameter metadata.

11. The system of claim 5, wherein the at least one computing device is further configured to execute the specific computer-executable instructions to at least generate intelligence based at least in part on the positive degree of correlation between the plurality of supplied values associated with the subset of the plurality of tailored documents.

12. The system of claim 5, wherein the at least one computing device is further configured to execute the specific computer-executable instructions to at least store the one of the plurality of tailored documents in a memory associated with the at least one computing device.

13. The system of claim 12, wherein the at least one computing device is further configured to execute the specific computer-executable instructions to at least encode a link to access the one of the plurality of tailored documents via a network.

14. The system of claim 5, wherein the at least one computing device is further configured to execute the specific computer-executable instructions to at least encode a link to the general document, wherein the link further contains the supplied values.

15. A computer-implemented method comprising:
identifying, in at least one computing device, parameter metadata associated with constructing one of a plurality of tailored documents from a first general document;
obtaining, in the at least one computing device, a plurality of supplied values associated with the parameter metadata;
identifying, in the at least one computing device, a plurality of values that may be retrieved, the plurality of values being identified based at least in part on the parameter metadata, the plurality of supplied values, and at least one data store;
obtaining, in the at least one computing device, a plurality of retrieved values associated with the parameter metadata;
constructing, in the at least one computing device, the one of the plurality of tailored documents from the first general document, at least one portion of a second general document, the plurality of supplied values, and the plurality of retrieved values, wherein the plurality of supplied values and the plurality of retrieved values supplant at least a portion of a plurality of parameter labels within a body of the first general document and the second general document;

determining, in the at least one computing device, a positive degree of correlation between a subset of the plurality of tailored documents, wherein the subset of the plurality of tailored documents includes multiple tailored documents and the positive degree of correlation indicates that the subset of the plurality of tailored documents are positively correlated by recognizing similarities within the plurality of tailored documents;

recognizing, in the at least one computing device, at least one symptom of a systemic event collectively reported within the subset of the plurality of tailored documents that are positively correlated;

identifying, in the at least one computing device, a response to the at least one symptom of the systemic event; and implementing the response as part of the subset of the plurality of tailored documents.

16. The computer-implemented method of claim 15, wherein the plurality of values that may be retrieved comprise a query of the at least one data store, wherein the query is associated with at least one supplied value.

17. The computer-implemented method of claim 15, further comprising modifying, in the at least one computing device, at least one supplied value within the one of the plurality of tailored documents after the one of the plurality of tailored documents has been constructed.

18. The computer-implemented method of claim 15, further comprising storing, in the at least one computing device, the one of the plurality of tailored documents in a memory associated with the at least one computing device.

19. The computer-implemented method of claim 15, further comprising encoding, in the at least one computing device, a link to the first general document, wherein the link includes the plurality of supplied values and the plurality of retrieved values corresponding to the one of the plurality of tailored documents.

* * * * *